Nov. 20, 1956
B. A. YOCKE ET AL
2,770,882
ARTIFICIAL MOUTH APPARATUS
Filed June 29, 1955
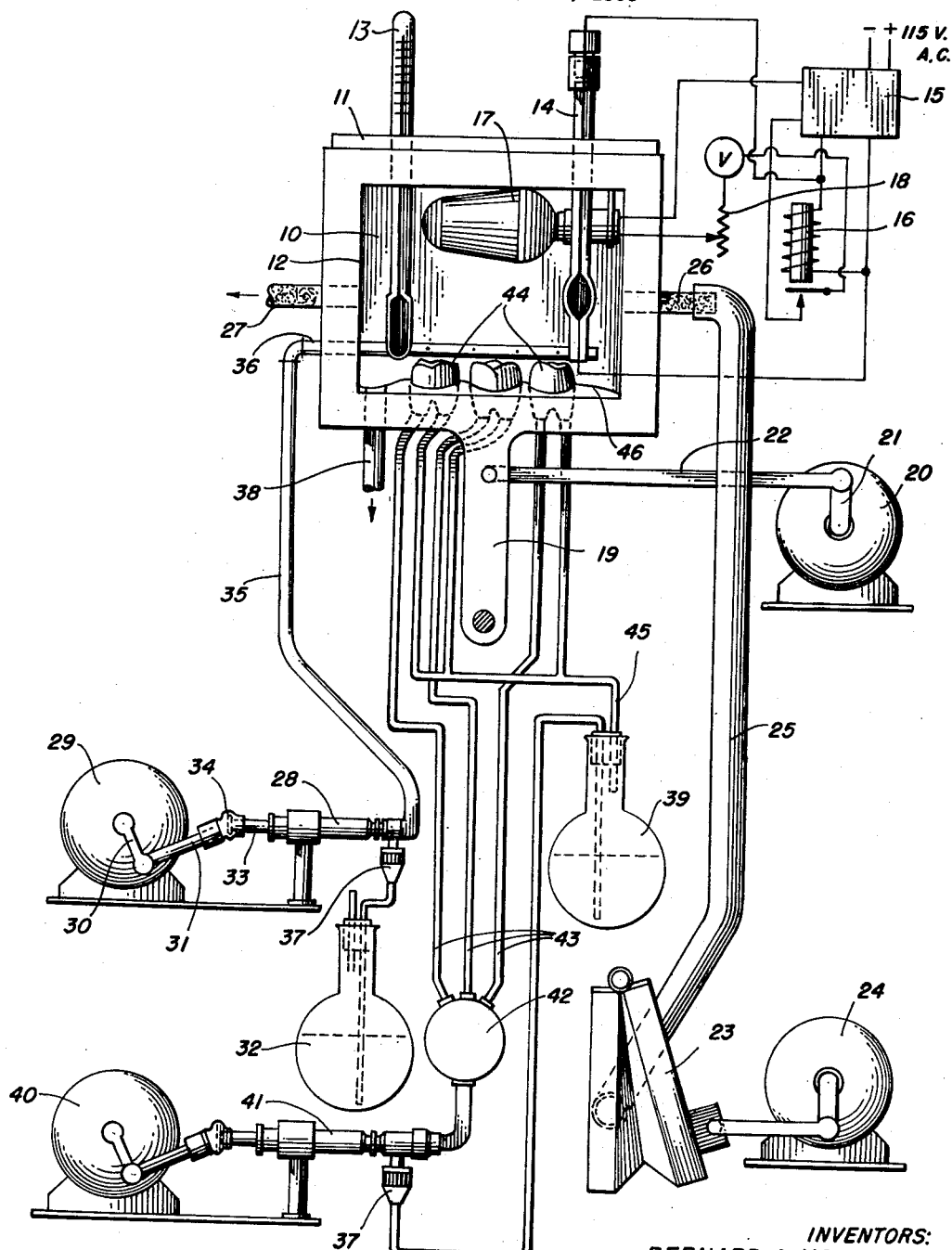
INVENTORS:
BERNARD A. YOCKE
WILLIAM J. CARTER
WALTER L. WHITE
BY
ATT'YS

United States Patent Office 2,770,882
Patented Nov. 20, 1956

2,770,882

ARTIFICIAL MOUTH APPARATUS

Bernard A. Yocke, Great Lakes, Ill., William J. Carter, Kansas City, Mo., and Walter L. White, Aurora, Ill.

Application June 29, 1955, Serial No. 519,011

6 Claims. (Cl. 32—71)

(Granted under Title 35, U. S. Code (1952), sec. 266)

The invention described herein may be manufactured and used by or for the Government of the United States of America for governmental purposes without the payment of any royalties thereon or therefor.

This invention relates to an apparatus adapted to function as an artificial mouth. More particularly, this invention relates to an apparatus having a chamber wherein conditions characterizing a human mouth may be substantially duplicated. The apparatus enables the carrying out of in vitro studies of a stomatological nature where the use of human subjects is neither desirable nor feasible.

The reproduction of normal physiological conditions that prevail in the mouth by mechanical or electro-mechanical means has been previously attempted but the prior art devices have not proven very satisfactory. The main disadvantage of these devices has been the inability to duplicate in an adequate manner the various functions through the use of relatively simple and inexpensive mechanical components.

Insofar as it is presently known, no single unitary device exists which contains certain physiological conditions including (1) breathing, (2) jaw movement, (3) oral temperature, (4) salivation, (5) pulpal circulation providing osmokinesis characteristics. The latter relates to movement of fluids under the influence of an osmotic gradient.

The artificial or experimental mouth herein disclosed is especially suitable for use in vitro studies involving various phases of dental research, for example, as dental caries and related problems. The device, however, may be readily modified to extend its applicability to studies of other types of mouth conditions and diseases. The concept of osmokinesis as applied to the caries process has been shown by Rapp in Journ. of Dental Research, vol. 31,477 (1952) to constaitute a highly important factor in that nutrients from the blood circulation of the tooth pulp can be drawn through the tooth under an adequate osmotic gradient to provide a substrate upon which microorganisms inhabiting the surface or subsurface of tooth enamel can act.

The present apparatus contemplates the provision of a chamber wherein all of the aforesaid physiological conditions present in the mouth have been simulated or duplicated by means of mechanical or electromechanical devices. In addition, means are provided for mounting specimens of hard tissues (teeth) within the chamber in a manner simulating the arrangement of teeth in the mouth and also for providing for the presence of microorganisms indigenous and exogenous to the mouth. If desired, means for brushing the teeth within the chamber may be provided and the chamber may be closed from bacterial contamination. Since more than one tooth can be placed in the chamber at one time, it becomes possible to also study the proximal surfaces of teeth utilizing the apparatus of the invention.

It is accordingly an object of the present invention to provide an apparatus adapted to function in a manner whereby the conditions present in a human mouth are substantially reproduced in improved detail within an enclosed segment thereof.

It is another object of this invention to provide an apparatus comprising an artificial or experimental mouth wherein the teeth mounted therein for in vitro stomatological studies are provided with pulpal circulation as well as other environmental conditions associated with the mouth.

Other objects and advantages will become apparent as the specification proceeds.

This invention may be more fully understood by reference to the appended drawing which schematically illustrates the apparatus including the artificial mouth enclosure and related elements for providing and regulating the various simulated physiological functions therein.

With reference to the figure, the enclosed chamber 10 may be of any desired size and constructed of various materials of construction suitable for the purpose. In the model shown, the box structure forming chamber 10 consists of a bottom and sides constructed of $\frac{1}{32}$ inch thick stainless steel providing a 2 x 2 x 3 inch internal enclosure. Plexiglass windows are provided for the top 11 and front 12 of the chamber, the top window being removable for providing access to the inside of chamber 10 for mounting teeth, or performing any desired manipulation therein.

A thermometer 13 supported on top 11 is positioned to indicate the temperature within the chamber and thermostat 14 is provided for adjusting and automatically maintaining the temperature therein at a predetermined value. The thermoregulator system shown in the figure for maintaining a predetermined constant temperature within the chamber comprises, in addition to a mercury-filled thermostat 14, a vacuum tube transformer 15 for actuating a low voltage relay 16 having points which are normally closed and which operates on 12 volts and 25 milliamperes. A heating element 17 consisting of a small bulb (115 v., 7 w. A. C.) mounted on a base located in the interior of the chamber is further controlled in its operation by a rheostat 18 wired through a voltmeter V which determines the degree of heat generated. The heating means arranged in accordance with the circuit diagram shown in the figure are capable of maintaining the temperature within an accuracy of ±0.5° C.

An oscillating movement of the entire chamber pivotally mounted on any suitable chassis (not shown) by means of chamber support 19 extending from the exterior surface of the chamber base is provided by a fractional horsepower motor 20 operating crank arm 21. The crank arm converts the rotary motion of the motor shaft to a reciprocating motion which is transmitted to the chamber assembly by rod 22 connected to the chamber support.

The breathing function of the chamber may be carried out very conveniently through the use of air bellows 23 operated by a fractional horsepower motor 24 connected therewith substantially as shown in the drawing. The air intake at each stroke during operation of the bellows is transferred by compression of the bellows through flexible tubing 25 connecting the bellows outlet with a breather inlet 26, preferably centered on one of the side walls of the chamber unit. An outlet 27 in the opposite wall permits a continuous exchange of the air within the chamber. The size of the bellows and the speed of operation may be readily adapted for any suitable breathing rate. For example, a bellows capable of delivering 6 cc. of air operating at the rate of 30 times per minute furnishes a complete exchange of air within the chamber approximately every 16 seconds.

A syringe-type pump 28 supported on the chassis and operated by motor 29 equipped with an eccentric wheel or crankshaft 30 and connecting rod 31 may be used for circulating saliva from the saliva reservoir 32 through the specimen chamber. In operation, the saliva is drawn from reservoir 32 on the uptake stroke of syringe plunger 33 connected to rod 31 by means of flexible joint 34 formed by the use of gum rubber or plastic tubing. On the discharge stroke of the pump, the liquid medium consisting of either human or artificial saliva is transmitted from the pump chamber through flexible tubing 35 terminating in a glass, plastic or metallic inlet tube 36 fixedly positioned within the chamber and extending substantially along its entire width. Inlet tube 36 is provided with a closed end and is apertured at appropriate intervals to permit the discharge of saliva at the desired points within the chamber. In the embodiment shown in the figure, the saliva inlet tube consists of a stainless steel needle from a Cornwall pipetting unit shortened to a length of 3 inches and sealed off at the terminal end. Three holes drilled in the needle cylinder with a No. ½ burr at ¾ inch intervals result in a satisfactory distribution of saliva. On the discharge stroke of the syringe pump plunger, the return of saliva to the supply reservoir may be prevented by the use of a valve device such as a Cornwall pipette valve unit 37 inserted in the intake line.

The base of the chamber contains an outlet 38 for drawing the excess saliva therefrom. The rate of saliva flow may be conveniently regulated by controlling the speed of motor 29 by the use of a rheostat (not known) and a constant volume of saliva at a predetermined level may be maintained in the specimen chamber by providing an airway between the saliva reservoir and the waste container. In a preferred embodiment, however, a chronometer unit wired into the circuit enables intermittent salivary circulation at desired time intervals thereby simulating the oral condition most effectively.

Physiological saline solution may be delivered from a storage vessel 39 containing the same by means of motor 40 adapted to actuate pump 41 in a manner similar to that described previously for the saliva circulation. In order to achieve a more uniform distribution of the medium through a plurality of outlets, however, it is preferred to pump the liquid to a distributor unit 42 from which it may be transferred by delivery tubes 43 connected with the specimen teeth 44 mounted in the experimental mouth chamber. The saline solution is thus circulated through the pulp chambers of the teeth and thereafter collected in discharge tubes 45 and returned to storage vessel 39 or a disposal tank as desired. For regulating the flow of the buffered solution for pulpal circulation, the motor speed and pump capacity may be adjusted therefor; however, the use of a rheostat for the purpose is preferred. For in vitro calculus and caries studies, one to eight or more teeth may be mounted in the specimen chamber. In the figure, three caries-free impacted molars 44 are shown in mounted position with their roots extending through the floor of the specimen chamber. The arrangement and spacing of the teeth relative to proximal surfaces, etc. should be such that oral conditions are duplicate as closely as possible. Any fused portions between mesial and distal roots are ground away and the roots are made cylindrical to permit effective fitting and sealing of the saline-conducting tubes thereon. Prior to positioning the teeth, the root canals are opened by drilling to facilitate passage of saline through the pulp chambers.

The teeth may be mounted as described above and sealed in the chamber with any suitable composition 45 as, for example, pink base plate wax. In addition to sealing the chamber, the wax is preferably applied in a manner such that the tooth enamel is exposed as in the human mouth and the gum line duplicated insofar as possible.

In an alternative embodiment of the specimen chamber, the base thereof may consist of a removable base plate of Plexiglass or similar material. Thus, the specimen mounting operation may be conducted with greater facility outside of the chamber. The plate with specimens mounted thereon may be adapted to fit over a protruding shoulder or interlocking member provided at the base of the chamber and may then be sealed with wax or the like to render the chamber fluid-tight.

In operation, the chamber is kept at a constant value corresponding to body temperature. This can best be accomplished by keeping the circulating liquids in saliva reservoir 32 and saline storage vessel 39 at a predetermined temperature in a constant temperature bath. The various components of the assembly may be actuated by switches connected into the respective circuits and mounted upon a control panel forming a part of the chassis structure of the unit.

The breathing apparatus described herein may be utilized for carbon dioxide or other gases as well as air for studies involving their relation to specific oral problems. The use of cotton filters in the inlet and outlet breather lines contribute to contamination-free operation, particularly when used in conjunction with conventional sterilization techniques that may be required in certain experiments utilizing the apparatus.

The chamber is kept in constant rocking motion with agitation occurring at the rate of ten times a minute or other suitable intervals for simulating the washing effect that saliva has on teeth in vivo. The agitation is also known to affect bacterial growth in a significant manner in some cases.

The saliva medium is circulated through the specimen chamber at any desired rate as previously indicated dependent upon the nature of the experiment. It has been found that a rate of about 3.8 cc. per minute using either human or artificial saliva is most satisfactory for dental caries studies. The physiological saline solution, on the other hand, is preferably delivered through the pulp chambers of the teeth at a pulsating rate of 0.4 cc., 72 times per minute. The osmokinetic principles are established by forcing the buffered solution through the pulp chambers of the teeth in the aforesaid manner.

While in the foregoing specification this invention has been described in relation to a preferred embodiment thereof, and specific details of this embodiment have been set forth for the purpose of illustration, it will be apparent to those skilled in the art that this invention is susceptible to other embodiments and that many of the details herein set forth can be varied considerably without departing from the basic concept of the invention.

We claim:

1. An artificial mouth apparatus comprising an enclosed chamber for mounting teeth therein, means for controlling the temperature within said chamber, means associated with the mounted teeth for circulating a physiological solution therethrough, means for maintaining a predetermined level of salivary fluid within said chamber in contact with the mounted teeth, breathing means for said chamber, and means for oscillating the chamber within a restricted arc of motion.

2. An experimental mouth for conducting in vitro oral studies therein comprising a liquid-tight chamber having a base adapted for mounting research specimens thereon, a thermoregulator system associated with said chamber for maintaining a substantially constant temperature therein, electromechanical means for intermittently circulating a buffered solution internally with respect to said mounted specimens and a salivary fluid externally thereto, means for oscillating the chamber within a restricted arc, and means for pumping a gaseous medium through said chamber.

3. The apparatus of claim 2 wherein the electromechanical means for intermittently circulating a buffered solution internally with respect to the mounted specimens comprises a motor-driven pump, an electrical intermittent chronometer connected with the motor for controlling the soltuion flow at set time intervals, a distributor associated with the delivery system for discharging a substantially uniform flow of fluid at a plurality of junctions comprising the specimens in said chamber and a draining tube for conducting the circulating medium away from the chamber.

4. The apparatus of claim 2 wherein the research specimens for mounting upon said base consist of teeth with hollowed pulpal chambers having rounded roots for sealingly engaging the tubes attacher thereto, said teeth being positioned to provide a proximal surface relationship corresponding to that of a human mouth and sealed with wax to simulate the gum line while exposing the enamel thereof.

5. The apparatus of claim 2 wherein the base for mounting the specimens thereon comprises a removable perforated tray, adapted for positioning teeth thereon with their roots extending below the horizontal plane of said tray, said tray being adapted for sealingly engaging the basal edges of the chamber to provide the artificial mouth enclosure.

6. The apparatus of claim 1 wherein the breathing means consists of an air bellows actuated by a fractional horsepower motor, a flexible tube connecting said bellows with one end of the chamber for delivery of air thereto and an outlet at the opposite end thereof for venting said chamber.

References Cited in the file of this patent
UNITED STATES PATENTS 1,967,786   Schulz _____ July 24, 1934